M. B. WALKER.
BOOK STRUCTURE.
APPLICATION FILED DEC. 7, 1916.
1,280,340.
Patented Oct. 1, 1918.
2 SHEETS—SHEET 1.
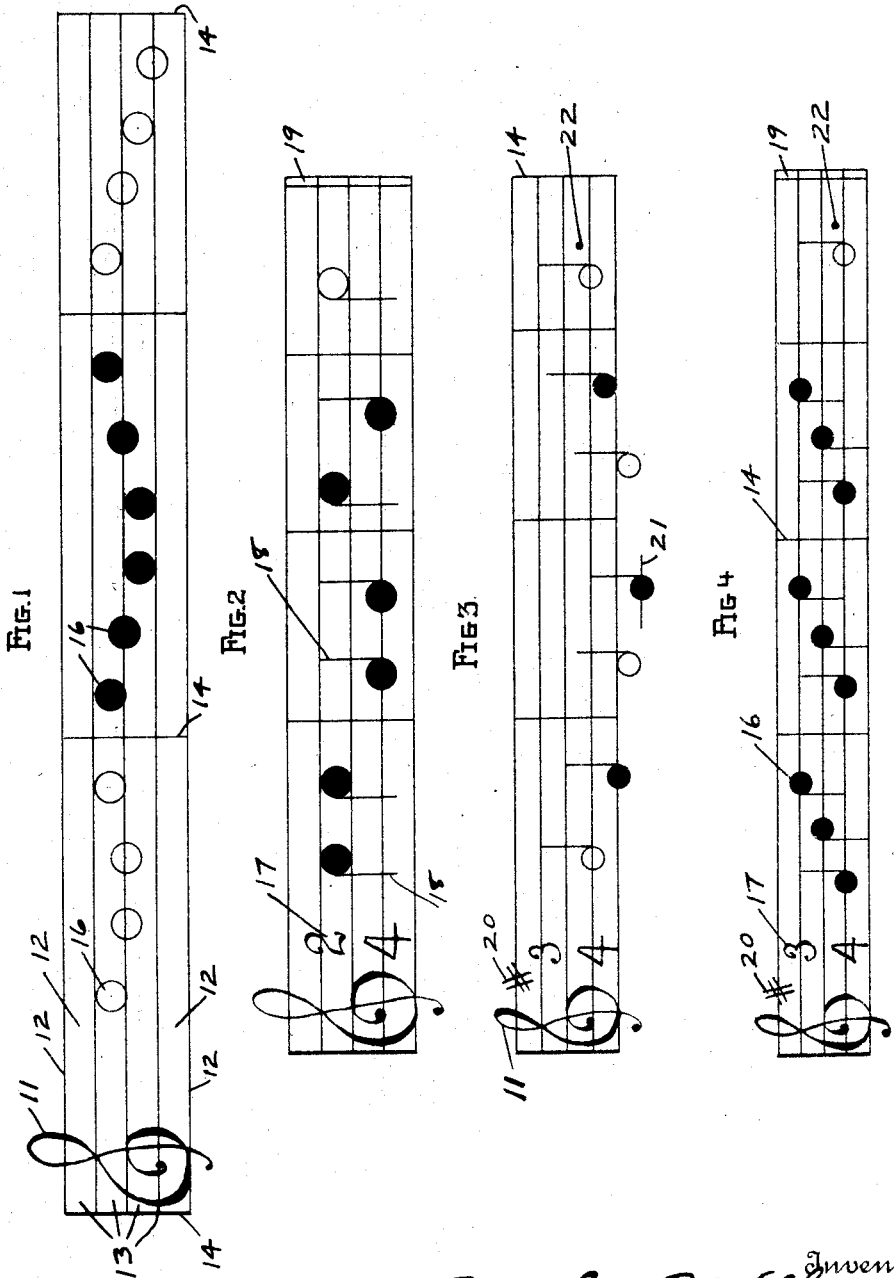

M. B. WALKER.
BOOK STRUCTURE.
APPLICATION FILED DEC. 7, 1916.
1,280,340.
Patented Oct. 1, 1918.
2 SHEETS—SHEET 2.
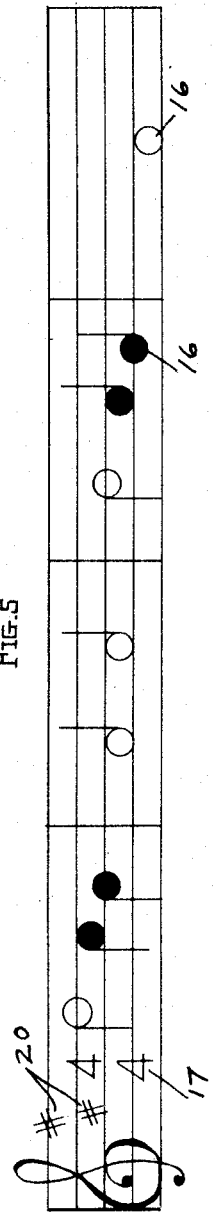
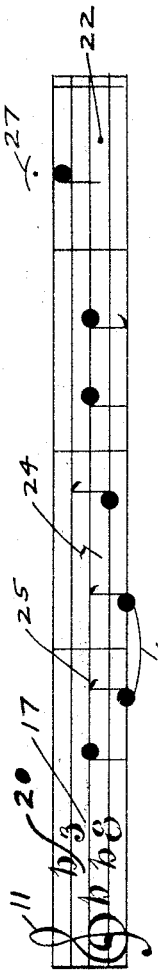
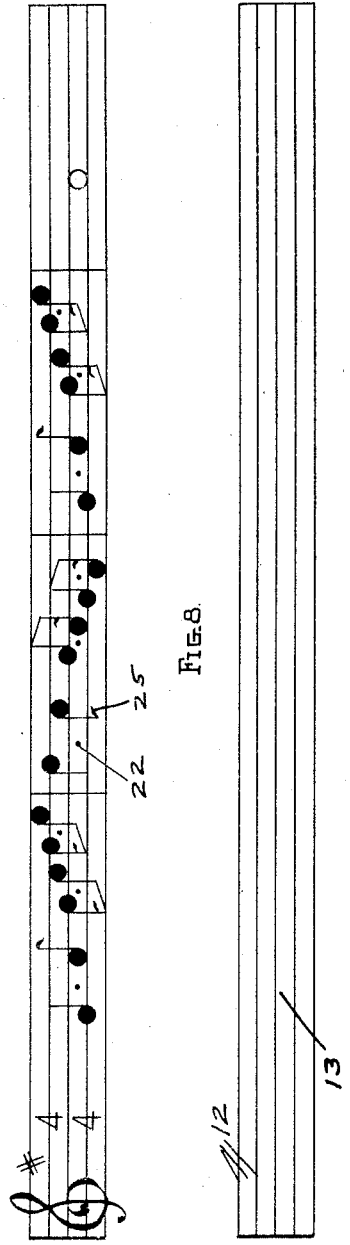
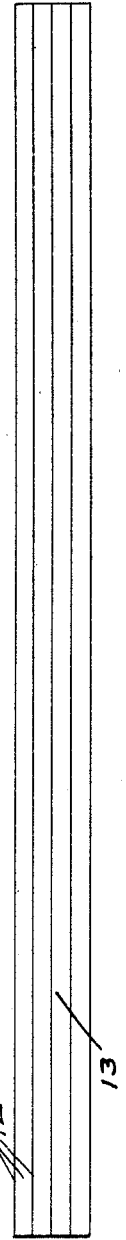
Inventor
Martha B. Walker,
By her Attorneys,
Emery, Booth, Janney & Varney

UNITED STATES PATENT OFFICE.

MARTHA B. WALKER, OF NEW MARKET, NEW HAMPSHIRE.

BOOK STRUCTURE.

1,280,340.  Specification of Letters Patent.  Patented Oct. 1, 1918.

Application filed December 7, 1916. Serial No. 135,590.

*To all whom it may concern:*

Be it known that I, MARTHA B. WALKER, a citizen of the United States, and a resident of New Market, in the county of Rockingham and State of New Hampshire, have invented an Improvement in Book Structures, of which the following is a specification.

This invention relates to a book structure, and with regard to certain more specific features, to a music primer.

Among the objects of the invention may be noted the provision of a book structure comprising a series of legends of progressively diminishing size, beginning with legends in which the characters are large enough so that the child or other student can put his finger on each character separately, or can point out or indicate the characters one at a time; and the provision of a music primer in which some of the notes and other indicia are large enough to be pointed out separately with the finger, and other notes are more nearly the size in general use. Other objects will be in part obvious and in part pointed out hereinafter.

The invention accordingly comprises the features of construction and operation, combinations of elements and arrangements of parts which are exemplified in the structure hereinafter described and the scope of the application of which will be indicated in the following claims:

In the accompanying drawings, in which is shown one of various possible embodiments of this invention, Figures 1 to 4 illustrate music scores in which the notes and other indicia are of progressively smaller size and spacing, and of progressively increasing complexity.

Figs. 5 to 7 show similar scores for the use of pupils who have completed the study of scores of the type indicated in Figs. 1 to 4.

Fig. 8 is a blank staff on which the pupil may write the various characters of staff notation as directed by the teacher.

Similar reference characters indicate similar parts throughout the several views of the drawings.

In considering this invention in its relation to the prior art, it may be noted that for many years attempts have been made to teach music and other subjects with the aid of books or other written or printed matter, and that difficulty has been encountered, especially in teaching children, in that the child does not readily grasp the significance of the various indicia of staff notation. The child often becomes confused, and I have found that this confusion is due in many instances to the fact that the notes and other characters are so spaced that the child does not readily consider them one at a time, and in endeavoring to understand the meaning of several notes in a group before appreciating the significance of the separate notes, he becomes confused and his progress is retarded. Furthermore, I have found that the confusion is often the result of an attempt to teach the subject of value of a note and the other features before the question of pitch is thoroughly understood. As the description progresses, it will be seen that in the present invention, these difficulties attending the use of prior-art books are overcome, and the present-day requirements of a clear and easily comprehended music primer or other book structure, are attained.

Referring now to the accompanying drawings, there is illustrated in Fig. 1 a portion of a music score. In the remaining six figures of the drawings, other scores of progressively increasing complexity, are shown, the score indicated in Fig. 7 being substantially of the size and complication encountered in the more advanced music books, which the child will be able to understand after he has mastered the elements of staff notation with the aid of the present book. In Fig. 8 the staff is left blank, for the pupil to use in learning to write the staff notation.

In Fig. 1, the clef 11, lines and spaces 12 indicating degrees of the staff 13, bars 14, notes 16, and other indicia, are each large enough and spaced far enough apart to be indicated separately with the finger. The child or other pupil attempting to learn the rudiments of written music can readily grasp the significance of the separate notes and other characters by having them pointed out to him one by one, and he can readily point to them himself or put his finger upon them separately, and thus readily acquaint himself with the purpose of the five horizontal lines and four spaces 12 of the staff 13, the clef 11, the bars 14 separating the measures, and the notes 16.

The other indicia used in staff notation, such as leger lines, time signatures, key signatures, accidentals, and the stems, hooks and other marks designating the length of the notes, may be applied to the staff of Fig. 1, but preferably these indicia are added gradually in order that the child may become accustomed to them one at a time. For example, in Fig. 2 the staff is smaller, and the time signature 17 and stems 18 of the notes 16, as well as the double bar 19, are added, and the score is divided into measures in accordance with the time signature.

In Fig. 3 the staff is still smaller, and a key signature 20, leger line 21, and dot 22 are shown.

In Fig. 4 the staff is further reduced in size.

In Fig. 5, a more complicated key signature is shown, and a greater variety of notes. The staff may be the same size as shown in Fig. 4, or smaller, but preferably the staff is of approximately the size of Figs. 1 and 2, in order to permit the child to become acquainted with the more complicated time signature and tone lengths.

In Fig. 6, there is a reduction in size of staff, together with the addition of rests 24, hooks 25, ties 26, holds 27, and a key signature in flats.

In Fig. 7, the size of the staff is again reduced with a greater variety of notes and accompanying marks.

As the child progresses, slurs, staccatos, the marks for repetition, and the various indicia of movement and volume, may be added, preferably one at a time, in order to facilitate the mastery of one feature before the next is offered.

These seven figures of the drawings indicate only diagrammatically the several portions of the book. A book that I have actually constructed and found satisfactory comprises seventeen pages of staves of the general type shown in Fig. 1, twenty-seven pages of the size and complexity indicated in Fig. 2, four pages similar to Fig. 3, five pages similar to Fig. 4, eleven pages similar to Fig. 5, thirteen pages of the type shown in Fig. 6, and fourteen pages of the comparatively complicated notation indicated in Fig. 7. Following these are fifteen pages of blank staves of the size indicated in Fig. 8. These are provided in order that the child may become accustomed to writing the staff notation himself. The several types of notation may be, and preferably are combined in a single book, but it will be obvious that the subject-matter could be divided into two or more books, or could be printed on loose sheets, without departing from the spirit of the present invention.

In view of the above, it will be seen that the several objects of this invention are achieved, and other advantageous results attained.

As various possible embodiments might be made of the above invention and as various changes might be made in the embodiments above set forth, it is to be understood that all matter herein set forth or shown in the accompanying drawings is to be interpreted as illustrative and not in a limiting sense.

Having thus described my invention, I claim and desire to secure by Letters Patent of the United States:

1. A music primer combining indicia of staff notation of progressively smaller size, some of said indicia being large enough so that the separate characters may be separately designated with the finger.

2. A book structure combining a plurality of sets of indicia, the characters in the several sets being progressively smaller, beginning with characters in the first set large enough to be designated separately with the finger and ending with characters in the last set of the size ordinarily employed in staff notation, the whole forming an elementary music book.

3. A music-book structure combining a plurality of sets of indicia of staff notation, the characters in the several sets being progressively smaller, some of the characters being large enough to be designated separately with the finger, and others being of the size ordinarily employed, the whole forming a music primer.

4. A book structure combining a plurality of sets of music staves having notes and other indicia of staff notation thereon, the staff degrees and indicia of the first set being large enough to be separately designated with the finger and decreasing progressively in successive sets to a size in the last set approximately equal to the size ordinarily employed in staff notation, and blank staves on which the pupil may write staff notation himself, the whole forming an elementary music book.

5. A music primer combining a plurality of sets of staves, the staves in each set being of progressively smaller size and carrying indicia of progressively smaller size, all the indicia being of progressing increasing complexity, the staff degrees and indicia at the beginning of the book being large enough to be separately designated with the finger, and at the end of the book being of the size ordinarily employed in staff notation.

In testimony whereof, I have signed my name to this specification this 2nd day of December 1916.

MARTHA B. WALKER.